FLUIDIC LOGIC MEMORY ELEMENT

Filed May 5, 1967 2 Sheets-Sheet 1

INVENTOR.
JOSEPH ABLER
BY Bair, Freeman & Molinare
ATTORNEYS

May 5, 1970 J. ABLER 3,509,897

FLUIDIC LOGIC MEMORY ELEMENT

Filed May 5, 1967 2 Sheets-Sheet 2

INVENTOR.
JOSEPH ABLER
BY Bair, Freeman & Molinare
ATTORNEYS

United States Patent Office

3,509,897

Patented May 5, 1970

3,509,897

FLUIDIC LOGIC MEMORY ELEMENT

Joseph Abler, Cleveland, Ohio, assignor to The Aro Corporation, a corporation of Ohio Filed May 5, 1967, Ser. No. 636,461
Int. Cl. F15c *1/06*
U.S. Cl. 137—81.5 6 Claims

ABSTRACT OF THE DISCLOSURE

A fluidic memory (R-S) element with a power input and two ouput channels each diverging at 30° from the direction of the input channel. A vent control channel is associated with each output channel. The chamber formed at the junction of the channels has smooth, continuous walls leading from the input to the output channels. The output flow is dependent upon which input control channel was last pulsed.

CROSS REFERENCES TO RELATED APPLICATIONS

The memory (R-S) element of this application may be incorporated in a Semi-Integrated Fluid Logic System of the type disclosed by Kautz et al., Ser. No. 622,122, filed Mar. 10, 1967 now Pat. No. 3,465,774. Furthermore, the fluid amplifier (NOR) element disclosed by Abler, Ser. No. 627,463, filed Mar. 31, 1967, now abandoned may be utilized in conjunction with the R-S element of this application to form complex fluid logic circuits.

BACKGROUND OF THE INVENTION

This invention relates to a fluid circuit device and more particularly a fluid circuit memory element.

One of the most recent areas of technological innovation concerns the use of fluids, such as air, in a network or circuit of conduits, chambers and valves to perform switching and other logic operations. The flow of fluids through conduits in a fluidic circuit is analogous to the passage of electrons through wires in an electrical circuit, and by controlling and amplifying the flow of fluids just as electron flow is controlled and amplified in electronic circuits, it has been possible to supplement and even replace some electronic devices. Because fluidic devices are substantially unaffected by temperature extremes, radiation, vibration or shock (conditions that often damage or render ineffective electronic circuits), these devices are currently being investigated for a number of uses including aerospace and military applications.

Fluidic devices are energized by the introduction of a continuous stream of fluid, usually air, into the power input channel of the device. For example, a constant pressure fluid flow is fed into the base leg of a Y-shaped channel. As the power input stream flows toward the port outlets at the end of the two diverging arms of the Y, a fluid flow phenomenon, called the "Coanda effect," causes the stream to attach itself to one side of the channel and flow out through only one of the arms. A control jet of fluid impinging at an angle against the power stream as it passes can force the power stream to attach itself to the opposite side of the channel. A pulse of fluid from a second control jet which opposes the first control jet can reverse the sequence.

By moving the control jet down the base leg of the Y away from the vertex, and by enlarging the channel around the vertex of the Y to form a chamber, one can eliminate the Coanda, "wall attachment," effect. In this case, by changing the control jet pressure, it is possible to proportionally vary the amount of fluid passing through a selected outlet arm of the Y-shaped channel. Control pulses of greater pressure will cause proportionally more fluid to pass through one arm of the Y.

Generally, there are two methods of switching or controlling the flow of the power stream in a fluidic device; namely, (1) by momentum interaction between the control stream and the power stream and (2) by a boundary layer action in which fluid is trapped in a boundary area or space between the power stream and a wall of the fluidic device. Fluid in the trapped area is at a relatively lower pressure than the power stream and tends to draw the power stream toward the wall. To deflect the power stream, fluid from a control port is injected into this low pressure area, raising its pressure, and forcing the power stream away from the wall.

A type of fluid memory element useful for the creation of complex fluidic circuits is commonly known as the R-S element. This is essentially a two position fluidic device wherein fluid flow through either of each stable position indicates an input control signal was last received for that position. Using the principles of R-S logic, a number of such devices may be combined to form a useful complex fluidic circuit. The characteristics of any complex circuit are dependant, in a large measure, upon the characteristics of the devices comprising the circuit. A R-S device ideally has quick response to a control flow, is operable and accurate over a wide range of pressures, has a high ratio of pressure output to pressure input, and responds to relatively low control pressures.

SUMMARY OF THE INVENTION

In a principal aspect the present invention takes the form of an improved fluidic amplification element and more particularly an improved memory or R-S element. Accordingly, a power input channel flows into a chamber, and output channels at the opposite end of the chamber diverge at about 30° angles from the direction of the input flow. The walls which pass from the input channel into the chamber are smooth surface continuations from the power input channel. Likewise, the walls from the chamber into the output channels are smooth, substantially straight line continuations of the chamber walls.

A vent channel is associated with each output channel immediately adjacent each exit position of an output channel from the chamber. A control channel is also associated with each output channel. Each control channel is situated substantially perpendicular to a chamber wall so that a control flow will intersect the power stream input flow which passes along that chamber wall at a right angle. Fluid flow through a control port impinges directly on the power stream fluid flow. Impingement of the power stream by the control stream causes the power stream to deflect to another outlet channel.

It is thus an object of the present invention to provide an improved fluid memory device.

It is a further object of the present invention to provide a fluid memory device adaptable to modular construction.

Still another object of the present invention is to provide a fluid memory device having quick response times to control pulses.

Another object of the present invention is to provide a fluid memory device useful over a wide range of pressures.

A further object of the present invention is to provide a fluid memory device which may be combined with similar fluidic devices to form complex fluidic circuits.

Still another object of the present invention is to provide an easily constructed, highly responsive and rugged fluid memory device.

These and other objects, features and advantages may be more readily understood by the detailed description which follows:

DESCRIPTION OF THE PREFERRED EMBODIMENT

Figures 1, 3, 4, 5:
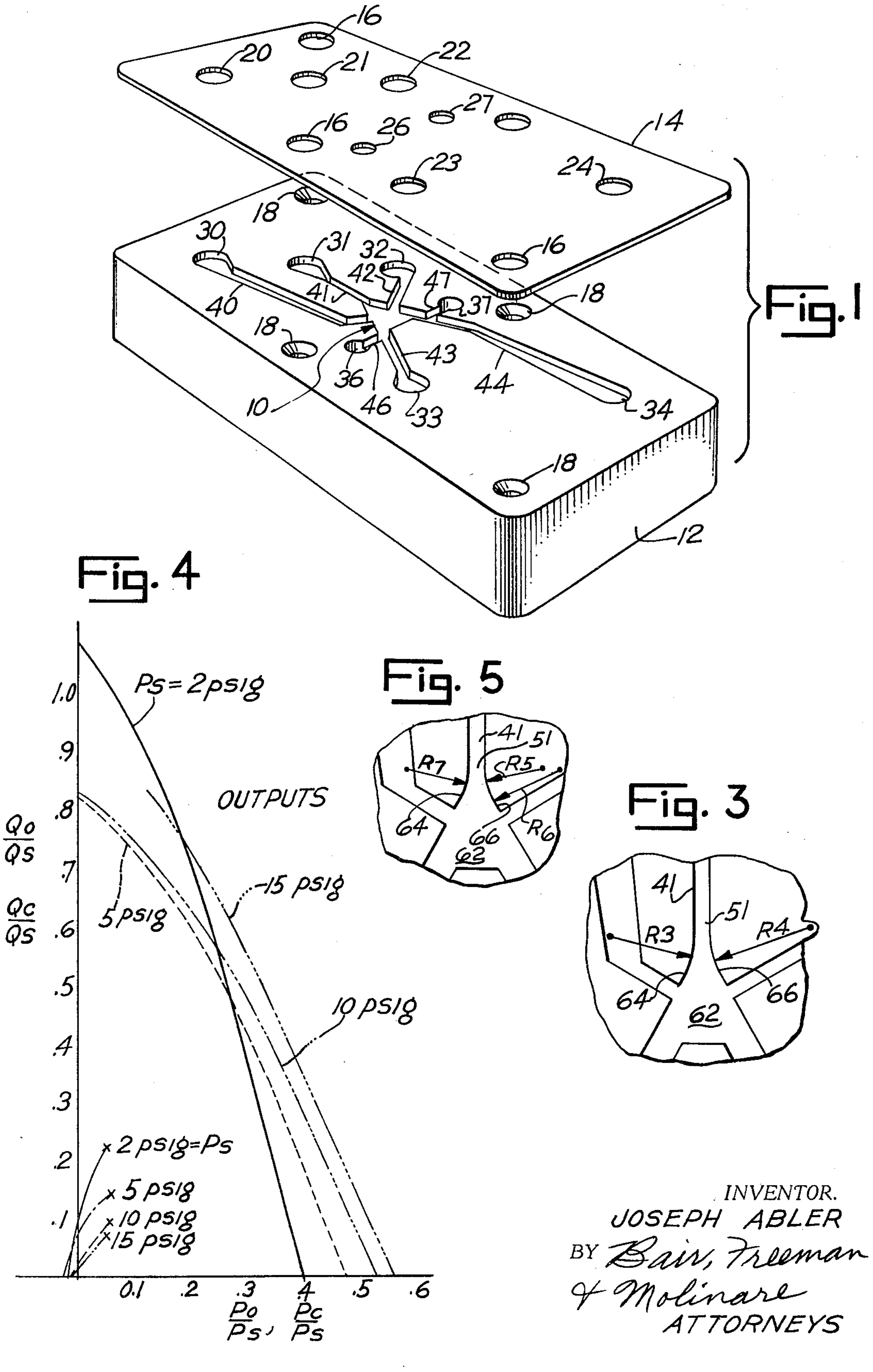
FIG. 1 is an exploded perspective view of the fluid circuit memory element and its cover plate.
FIG. 3 is a plan view of a partial section of the fluidic device showing an alternate construction of the input.
FIG. 4 is a graph illustrating pressure and quantity output as a function of pressure input.
FIG. 5 is a plan view of a partial section of the fluidic device showing a second alternate construction of the input.

This device is a pure fluid amplifier which has two stable states. The element is more exactly defined as a memory or R-S element. In FIG. 1, the memory element formed by a system of interconnecting passageways generally shown at 10, is defined by the block 12 and the cover plate 14 which mates with the block 12. The cover plate 14 is attached to the block 12 by fastening means (not shown) passing through the fastening holes 16 in the cover plate 14 and fastening holes 18 in the blockk 12. There are five spaced openings 20 through 24 in the cover plate 14. When the cover plate 14 and the block 12 are mated, the openings 20 through 25 are positioned over the enlargements 30 through 34 respectively. The enlargements 30 through 34 are connected to the fluid nozzles 40 through 44 respectively.

The enlargements 30 through 34 are modularly spaced and the block 12 is modularly constructed so that the fluid amplifier may be incorporated in a Semi-Integrated Fluidic Logic System of the type disclosde in the copending application, Ser. No. 622,122, filed on Mar. 10, 1967, by Kautz et al.

When the fluidic device is being operated, the block 12 and plate 14 are mated and external fluid conduits are connected to the several openings 20 through 24 in the plate 14. A fluid flow pressure supply is fed through the supply opening 21. Control flows are fed through the control openings 20 and 22. Outlet flows may be sensed through one or the other of the outlet openings 23 or 24. Vent openings 26 and 27 connect vent enlargements 36 and 37 with the atmosphere. The vent enlargements 36 and 37 are connected to the vent nozzles 46 and 47.

Figure 2:
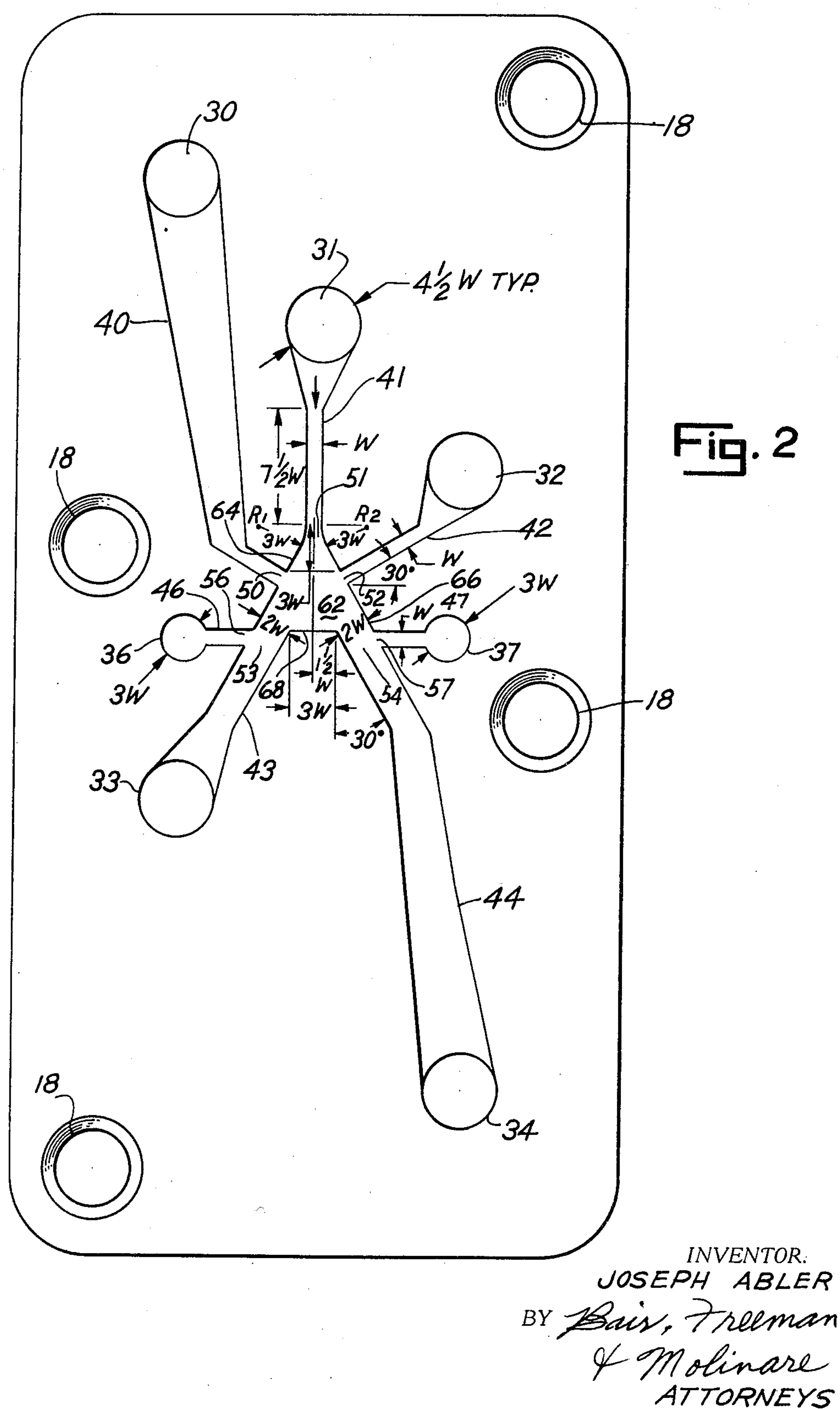
FIG. 2 is a plan view of the fluidic memory device.

The operation of the device may, perhaps, be best explained by referring to the plan view of FIG. 2. A jet of fluid, injected through the input enlargement 31 flows through the input nozzle 41 in the direction of the arrow and into the chamber 62 through the input port 51. The jet of fluid provided through the port 51 travels along either the upper curved wall 64 or the lower curved wall 66 of the chamber 62. The upper wall 64 and lower wall 66 are smooth surface continuations of the input nozzle 41 walls. The power stream continues through the chamber 62 and exits through either outlet port 53 or 54. The outlet ports 53 and 54 are situated at the end of the chamber 62 opposite the inlet 51 and diverge from the direction of the power input at an angle of about 30°.

The wall 64 or 66, along which the jet initially travels when supply is turned on, will be randomly determined unless the chamber is geometrically constructed to favor one wall or the other. This construction might be accomplished by providing a different radius of curvature in the chamber wall where it is joined to the inlet port 51. For example, in FIG. 2 the radii of curvature $R_1$ and $R_2$ defined by the inlet port 51 and the upper chamber wall 64 and lower chamber wall 66 respectively are equal. Initial output flow from the fluid memory device will be random. In FIG. 3, however, the respective radii of curvative $R_3$ and $R_4$ are unequal, the radius of curvature $R_4$ being greater than $R_3$. The input fluid flow through the port 51 will attach to the more gently curved wall, namely, wall with the greater radius of curvature $R_4$, the lower wall 66.

FIG. 5 illustrates another advantageous alternative construction of the curvature of the chamber walls 64 and 66. The radius along the lower wall 66 varies logarithmically as exemplified by the radii $R_5$ and $R_6$. The radius $R_7$ associated with the upper wall 64 is constant. Many other combinations and permutations of the radii are possible and are considered within the scope of the claimed invention.

After an input jet attaches to either the upper wall 64 or the lower wall 66 it will remain attached to that particular wall. The stream will flow through one of the output channels 53 and 54. The output channels 53 or 54 both have a smooth surfaced, continuous wall common with the chamber wall 64 and 66 respectively along which the power stream is flowing. However, for example, when a control signal is fed through the control port 50 while the stream flows along the upper wall 66, the jet will switch positions. The control pulse forces the input jet to the opposite wall and thus to an opposite outlet port 53 or 54. Therefore, flow out of port 53 indicates that the last control signal cam through port 52. Likewise flow out of port 54 indicates that the last control signal came from the control port 50.

The vent ports 56 and 57 provide relief for the supply jet should their associated respective exit ports 53 and 54 be blocked. There relief vents 56 and 57 prevent a local pressure build up caused by blocked exits 53 or 54. Otherwise, a pressure buildup would cause the input supply jet to switch to the opposite wall in the absence of a control signal through either of the control ports 50 or 52. The planar wall or splitter 68 between the output ports 53 and 54 prevents spill-over flow from one outlet port to another. This insures that only one port 53 or 54 delivers output flow at a given time.

There are several unique features of the present invention. The smooth, continuous curved upper and lower walls 64 and 66 leading from the inlet port 51 into the chamber 62 and then to outlet channels 53 or 54 provide the supply jet with an excellent attachment surface. The supply jet is thus enabled to remain attached to either wall and is relatively insensitive to downstream disturbances in the ports 53 or 54.

In addition the curved wall is responsible for high flow and pressure recovery. Substantially all (100%) of the supply flow from port 51 is recovered in port 53 or 54, and 50% of the total pressure of the input port 51 is recovered in the output ports 53 or 54. By contrast, a turbulent separation point (in the wall attachment bubble) exists in an offset attachment Coanda wall device. The non-separating flow in the curved element of the present invention therefore causes less energy loss in the supply jet than occurs in offset attachment wall devices. This provides increased pressure and flow recovery.

Since this is a momentum interaction device, the control flows impinge directly upon the power stream. Consequently, the attached input jet is extremely sensitive to control flows through the ports 50 or 52. Because the element is very sensitive to control flow and has a high flow recovery, the element also has a higher gain (output flow to control flow ratio) than conventional wall attachment devices.

The control ports 50 and 52 are placed perpendicular to the upper wall 64 and lower wall 66 respectively. They are positioned at a point substantially midway between the inlet port 51 and the outlet ports 53 and 54. At this midway point the supply jet is most sensitive to a perpendicular force, therefore also providing high control signal sensitivity. A close examination of FIG. 2 reveals the preferred positioning and elongated shape of the inlet nozzle 41, the inlet port 51, the shape of the upper and lower chamber walls 64 and 66, and the positioning of the control ports 50 and 52.

The vent nozzles 46 and 47 are placed perpendicular to the direction of the input supply nozzle 41 and adjacent the output ports 53 and 54. This provides a bleed for the main supply jet at 60° to the direction of flow near the vent. This particular angle and position increases vent effectiveness for large output port 53 or 54 restrictions.

All channels or nozzles in the device have been limited to a minimum width, W, which is the width of the supply or input nozzle 41. Preferably, the device is defined by rectangular side walls extending to a co-planar depth. The depth of the channels is preferably 1.6 times the nominal width, W. All channels are separated from one another by at least one nominal width, W. This allows the element to be constructed using conventional manufacturing techniques.

FIG. 4 shows normalized outlet port and control port flow pressure curves at various supply pressures for a R-S element with W=0.0315" and with the radii equal and contant, i.e., $R_1=R_2=3W$. $P_s$ is the supply pressure in inches of water, $P_o$ is the output pressure; $Q_s$ is the supply amount of fluid in standard cubic feet per minute, and $Q_o$ is the output supply. At one p.s.i.g. supply pressure (not graphed), the attachment is not strong enough to avoid switching under a blocked load. Consequently, 1½ p.s.i.g. is approximately the lowest usable supply pressure of the device. Data was taken for both outlet ports 53 and 54, but since the two ports were almost identical in their flow pressure characteristics only one curve is shown for each supply pressure. Also graphically illustrated in FIG. 4 are control switch port data which was taken with the outputs unloaded. $P_c$ represents the control port pressure. Pressure at the control port causes switching where the graph line terminates. Although not graphically shown switch loads and pressures did increase slightly as the outputs were blocked.

At a supply pressure of 20 p.s.i.g., attachment could not be maintained on the wall. Thus 20 p.s.i.g. represents an upper limit of operation of the device. However, if larger radii of curvature $R_1$ and $R_2$ were provided at the port 51, the effective range of the device could be increased.

To summarize, the following characteristics and advantages are among those exhibited by the R-S element of this invention: It is substantially insensitive to load disturbances; it has a high gain, and high flow and pressure recovery; it has a fast response and should switch in the range of 0.001 to 0.002 second; it has invariant control port-flow pressure curves regardless of the outlet port; it is easily constructed and has integrated circuit capability; the range of operation for an element where W=0.0315" and $R_1=R_2=3W$ is to 1½ to 15 p.s.i.g.; and control pressure to switch the element increases with increasing restriction on the outlet port into which the jet is switching.

Finally, it has been determined that an R-S element has output pressure sufficient to drive four other similar R-S elements.

What is claimed is:

1. A fluid memory device which accepts fluid input and control signals and emits responsive signals comprising, in combination, (a) a parallel walled, input channel defining a path of power stream fluid flow, (b) at least two parallel walled, output channels each of said output channels defining a path of fluid flow, (c) a chamber formed by the intersection of said input and said output channels, said chamber having walls which are smooth surfaced continuations of said channels, said output channels being divergent from said input channel to provide a power stream input fluid flow passing through said chamber and exiting through any of said output channels diverging at an angle of about 30° from said power stream fluid flow input direction, said chamber walls smoothly connecting said input and said output channels such that said power stream fluid flow from said input channel will effectively attach to said smooth-surfaced, continuous wall of said chamber and follow said wall through one of said output channels, (d) a single, parallel walled control channel associated with and adjacent to each of said output channels, each one of said control channels being positioned substantially perpendicular to said chamber wall and positioned to intersect said power stream fluid flow passing through said chamber from said input channel and out through the respective output channel associated with said single control channel, (e) a single, parallel walled, vent channel associated with each of said output channels, each of said single vent channels being substantially perpendicular to the projected path of said input channel, each of said vent channels being positioned in said chamber adjacent the exit from said chamber of said respective output channels with which said vent channel is associated, each of said vent channels being nearer said associated output channel than said associated control channel, said input channel, said control channels and said vent channels being of substantially the same dimensions and said output channels being at least equal to said input channel dimensions, and (f) a planar wall in said chamber defined between said output channels, said planar wall being substantially perpendicular said fluid flow power stream input channel.

2. A fluid memory device as set forth in claim 1 wherein said smooth surfaced continuation of said input channel into said chamber defines a uniform radius of curvature from said input channel into said chamber.

3. A fluid memory device as set forth in claim 1 wherein said smooth surfaced continuous walls from said input channel into said chamber have unequal radii of curvature to provide attachment of a power stream fluid flow initially entering into said chamber from said input channel to that chamber wall having the greater radius of curvature, said power stream following that wall into the output channel which is a smooth surfaced continuation of that chamber wall, there being no initial control pulse from said control channels during the initial power stream fluid flow input.

4. A fluid memory device as set forth in claim 1 wherein said smooth surfaced continuous walls from said input channel into said chamber have unequal and non-uniform radii of curvature with at least one of said radii varying logarithmically along the chamber wall.

5. A fluid memory device as set forth in claim 1 wherein all of said channels are co-planar and said output channels number two.

6. A fluid memory device as set forth in claim 5 wherein said channels and said chamber are defined in a block of material having a top surface and said device has walls normal to said top surface and extending into said surface to a co-planar depth of 1.6 times the width of the input channel defined in said top surface.

References Cited

UNITED STATES PATENTS

| | | | |
|---|---|---|---|
| 3,181,546 | 5/1965 | Boothe | 137—81.5 |
| 3,232,533 | 2/1966 | Boothe | 137—81.5 XR |
| 3,269,419 | 8/1966 | Dexter | 137—81.5 |
| 3,270,758 | 9/1966 | Bauer | 137—81.5 |
| 3,275,013 | 9/1966 | Colston | 137—81.5 |
| 3,329,152 | 7/1967 | Swartz | 137—81.5 |
| 3,340,884 | 9/1967 | Warren et al. | 137—81.5 |
| 3,380,655 | 4/1968 | Swartz | 137—81.5 XR |

SAMUEL SCOTT, Primary Examiner